US006798855B1

(12) United States Patent
Zirwas

(10) Patent No.: US 6,798,855 B1
(45) Date of Patent: Sep. 28, 2004

(54) METHOD AND ARRANGEMENT FOR FAST SYNCHRONIZATION OF TWO CARRIER SIGNALS

(75) Inventor: Wolfgang Zirwas, Gröbenzell (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/463,529

(22) PCT Filed: Jul. 13, 1998

(86) PCT No.: PCT/DE98/01953

§ 371 (c)(1),
(2), (4) Date: Jan. 26, 2000

(87) PCT Pub. No.: WO99/07098

PCT Pub. Date: Feb. 11, 1999

(30) Foreign Application Priority Data

Jul. 30, 1997 (DE) ......................... 197 32 894

(51) Int. Cl.[7] .............................. H04L 7/00; H03D 3/24
(52) U.S. Cl. ..................................... 375/354; 375/327
(58) Field of Search .............................. 375/324, 327, 375/371, 373, 376, 332

(56) References Cited

U.S. PATENT DOCUMENTS

| 3,769,587 A | * | 10/1973 | Matsuo et al. ............... 375/376 |
| 3,984,777 A | | 10/1976 | Noguchi |
| 4,095,187 A | * | 6/1978 | Yoshida ....................... 329/309 |
| 4,281,412 A | * | 7/1981 | Wissel et al. ................ 375/332 |
| 4,757,272 A | * | 7/1988 | Okada et al. ................ 329/308 |
| 5,014,283 A | | 5/1991 | Baier |
| 5,260,975 A | * | 11/1993 | Saito ........................... 375/327 |
| 5,412,694 A | * | 5/1995 | Sato et al. .................... 375/330 |
| 6,377,634 B1 | * | 4/2002 | Yamamoto .................... 375/324 |

FOREIGN PATENT DOCUMENTS

| DE | 2 213 680 | 10/1973 |
| EP | 0 760 567 A2 | 3/1997 |

* cited by examiner

Primary Examiner—Stephen Chin
Assistant Examiner—Lawrence Williams
(74) Attorney, Agent, or Firm—Staas & Halsey LLP

(57) ABSTRACT

During the synchronization, a first, analog carrier signal (bs) exhibits a predetermined phase position at least temporarily. A further reference carrier signal (rs) is modulated with the same prescribable phase position, the phase difference between the two modulated carrier signals (bs, ts) is identified and, subsequently, the phase position of the reference carrier signal (rs) is corrected by the identified phase difference. As a result thereof, the phase difference is identified and corrected very fast. The inventive method is advantageously utilized in the demodulation of high bit rate carrier signals (bs) particularly carrier signals (bs) transmitted burst-like.

29 Claims, 4 Drawing Sheets

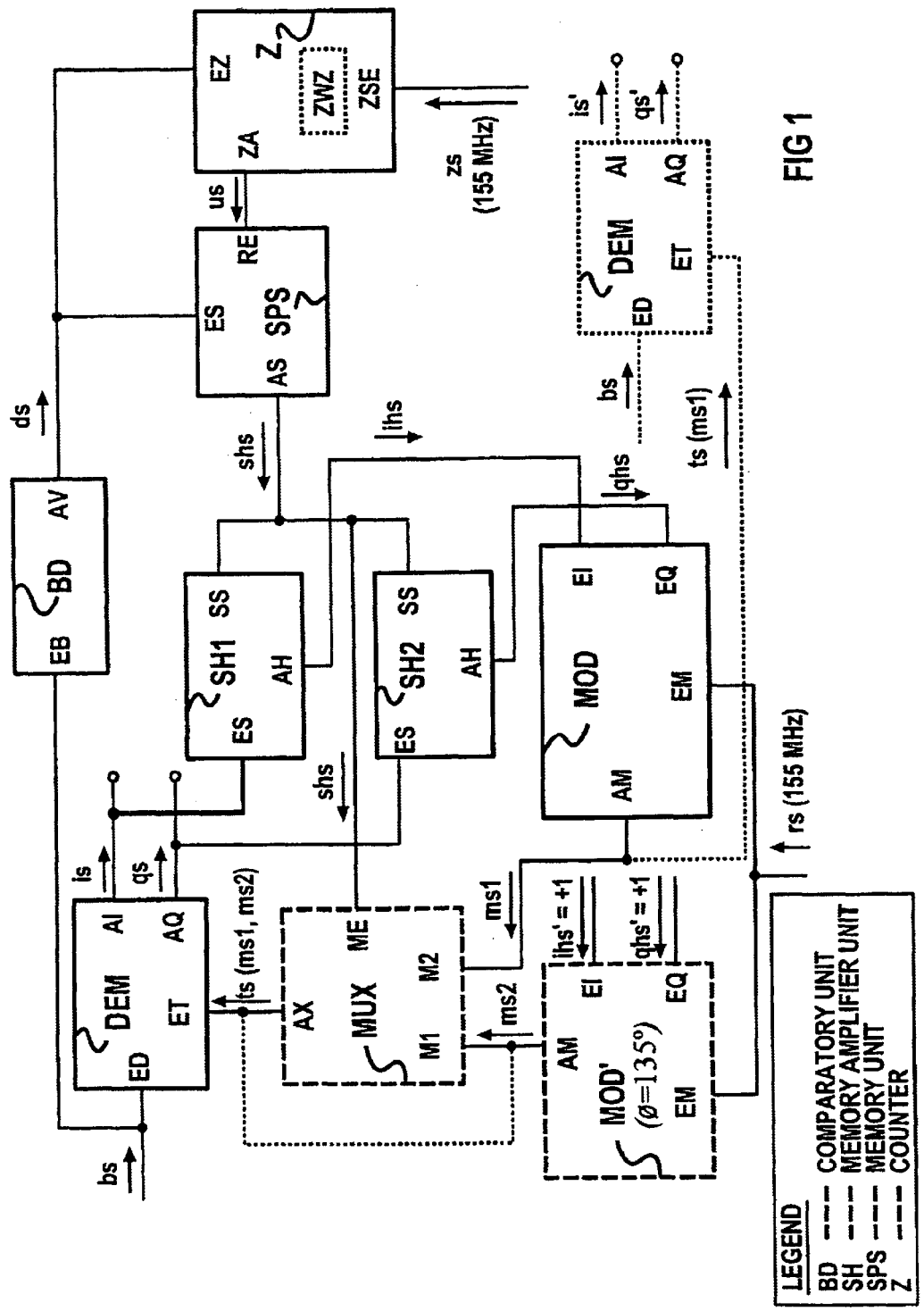

METHOD AND ARRANGEMENT FOR FAST SYNCHRONIZATION OF TWO CARRIER SIGNALS

This application is a 371 of PCT/DE98/01953 Jul. 13, 1998.

The increasing user acceptance as well as technological progress in the development of new broad band services—also referred to as multimedia services—lead to an increasing need for broad band transmission sources in communication networks that already exist or are to be newly installed. In order to effectively and economically realize broad band applications, particularly multimedia services making use of high data transmission rates—for example, "video on demand", video conference, toy shopping or telebanking—, a broad band communication network, particularly a broad band offering network is required. In currently installed offering networks, the network resources available are divided onto the network termination units connected to the communication network or onto the communication terminal devices connected to the network termination units. The access of the network termination units or of the communication terminal devices to the commonly used transmission medium—for example, light waveguides or radial channel—is thereby controlled such by a transmission method that respectively only one network termination unit or communication terminal device is at least temporarily granted the access authorization.

Given an offering network realized by wireless radio channels, a plurality of network termination units—also referred to as network terminations—are connected to a base station centrally arranged in a radial cell—also referred to as radial base station. The data transmission rate—for example, an aggregate bit rate of 155 Mbit/s—available in the offering network is thereby divided onto the network termination units currently connected to the base station. In current wireless offering networks, different transmission methods respectively adapted to the required data transmission rates are utilized for the data to be transmitted in the direction of the network termination units—also referred to as the downstream direction—and for the data to be transmitted from the network termination units to the base station—also referred to as the upstream direction. Time-division multiplex or time-division multiple access method—also referred to as TDMA method—represents one transmission method utilized for the data to be transmitted in the upstream direction or the data streams to be transmitted. In this transmission method, brief signal sequences—also referred to as signal bursts—are sent to the base station in alternation by the network termination units. Access onto the transmission medium or onto the radial channel is controlled by the base station such that respectively only the network termination unit sends information or, respectively, a signal burst to the base station.

In existing offering networks with light waveguide transmission, for example in a SOAP system—Siemens Optical Advanced PON—a signal burst covering 60 bytes of digitized data or, respectively, a data frame covering 60 bytes of data—also referred to below as SOAP data frame—is transmitted in the upstream direction by a respective termination unit. The preamble of each SOAP data frame comprises 7 bytes, or by 40 bits of the preamble covering 7 bytes are provided as synchronization bits for the determination of the signal parameters of the signal bursts arriving at the receiver side. The determination of the signal parameters, i.e. the determination of the amplitude as well as of the carry and clock phase within the time available for the synchronization—40 bits here—is also referred to as "Runin". Different wireless offering networks comprising radial channels, the data to be communicated from the network termination units to the base station, i.e. the SOAP data frame to be transmitted, is advantageously modulated onto a carrier signal at a predetermined frequency with a coherent modulation method, usually by a phase modulation method that is also referred to as Phase Shift Keying PSK. Offset quadrature four phase keying—also referred to as Offset-Quadrature-Phase-Shift-Keying OQPSK—has proven to be an advantageous modulation method for the transmission of digitally existing data via radial channels. Since the individual network termination units respectfully sending a signal burst at different points in time have different distances from the base station, the amplitude as well as the carrier and clock phase during the "Runin" must be respectively identified for each signal burst arriving at the base station. Only a very brief time interval of 258 ns during the "Runin"—corresponding to the time duration of the transmission of the 40 synchronization bits of the SOAP data frame—are thus available for the realization of a radial system having an aggregate bit rate of, for example, 155 Mbit/s for determining the signal parameters of signal bursts arriving at the base station. In particular, the carrier phase of the carrier signal transmitted burst-like must be very exactly identified for an optimum demodulation of the data transmitted via a radial channel and a synchronization must be produced for the demodulation.

U.S. Pat. No. 4,095,187 discloses a demodulator for phase-modulated carrier signals wherein an incoming, first, analog, phase-modulated carrier signal is synchronized with a second analog carrier signal generated with the assistance of a voltage-controlled oscillator allocated to the demodulator. The phase-modulated carrier signal incoming at the demodulator is demodulated and, dependent on the demodulation result, the second carrier signal locally generated in the demodulator is modulated or "re-modulated". The phase of the incoming, phase-modulated carrier signal is compared to the phase of the re-modulated carrier signal with the assistance of a phase comparator and the voltage-controlled oscillator is driven dependent on the comparison result.

Further, U.S. Pat. No. 4,757,272 discloses a demodulator for regeneration of an analog reference carrier signal and for demodulation of a phase-modulated, four-phase PSK modulation signal that is transmitted burst-like. The four-phase PSK modulation signal transmitted burst-like comprises a preamble, whereby the preamble is at least partially modulated with a predetermined modulation symbol at the transmission side. For reception-side generation of the reference carrier signal, the received four-phase PSK modulation signal is modulated with the predetermined modulation symbol during the reception of the preamble, i.e. is inversely modulated, whereby a regenerated, analog carrier signal without phase-modulated parts is formed. The regenerated carrier signal is subsequently supplied to what are referred to as AFC means that, among other things, realize a PLL circuit arrangement. With the assistance of the AFC means, the frequency-corrected and phase-corrected reference carrier signal is derived from the regenerated carrier signal, this being subsequently forwarded to an orthogonal demodulator for demodulation of the incoming four-phase PSK modulation signal.

SUMMARY OF THE INVENTION

The present invention is based on the object of improving the synchronization for the demodulation of information or data modulated onto a carrier signal transmitted burst-like.

This object is achieved in accordance with the present invention in a method for fast synchronization of a first analog carrier signal generated at a transmitter with a second carrier signal generated in a receiver, said method comprising the steps of: at least partially modulating a preamble of said first carrier signal with a predetermined phase position at said transmitter; modulating said second carrier signal with said same predetermined phase position at said receiver; identifying a phase difference between said modulated first carrier signal and said modulated second carrier signal; and following a phase difference recognition time, correcting a phase position of said second carrier signal by said identified phase difference.

This object is also achieved in accordance with the present invention in an arrangement for fast synchronization of a first analog-carrier signal generated in a transmitter with a second carrier signal generated in a receiver. A transmitter has a first modulator for an at least partial modulation of a preamble of the first carrier signal with a predetermined phase position. A receiver has a second modulator for modulation of the second carrier signal with the predetermined phase position, a phase difference identification device for determining a phase difference between a modulated first carrier signal and a modulated second carrier signal, and a correction device for correction of a phase position of the second carrier signal by an identified phase difference.

The critical aspect of the inventive method for fast synchronization of a first, analog carrier signal generated at the transmission side with a second carrier signal generated in a receiver is comprised therein that, at the transmission side, a preamble of the first carrier signal is at least partially modulated with a predetermined phase position and, at the reception side, the second reference carrier signal is modulated with the same, predetermined phase position. The phase difference of the modulated first carrier signal and of the modulated second carrier signal is subsequently identified, and, after a phase difference recognition time, the phase position of the second modulated reference carrier signal is corrected by the identified phase difference.

As a result of the inventive method, advantageously, the phase difference between the two modulated carrier signals is acquired very fast, i.e. within the "Runin" that covers only a very short time span—also referred to as phase difference recognition time below—and is thus identified, for example within a time span of 100 through 200 nm—whereby the phase position of the second carrier signal is very exactly adapted to the phase position of the first carrier signal following the phase difference recognition time. While existing, a digital reference carrier signal, is digitally modulated with the predetermined phase position and is subsequently converted from digital to analog. In an embodiment, the phase difference of the two modulated carrier signals is identified in analog fashion and, following the phase difference recognition time, the phase position of the second, modulated reference carrier signal is digitally corrected by the identified phase difference—claim 3. In an embodiment, given a digitally existing reference carrier signal, the first, analog carrier signal is converted analog-to-digital, and the phase difference of the two modulated and digitalized carrier signals is digitally determined. Following the phase difference recognition time, the phase position of the second, modulated reference carrier signal is digitally corrected by the identified phase difference. As a result of the advantageous, digital correction of the phase position of the second modulated reference carrier signal, disadvantages of analog methods for correction of a phase difference—for example, temperature and voltage drift, offset and balancing procedures—are avoided and, thus, the quality of the demodulation of the message data communicated by the first carrier signal is improved.

In an embodiment, during the phase difference recognition time, advantageously, phase signals representing the phase difference are formed, whereby the values of the phase signals are stored at the end of the phase difference recognition time. Following the phase difference recognition time, the phase position of the second carrier signal is corrected by the phase difference represented by the stored values of the phase signals. As a result of the advantageous storing of the values of the phase signals, circuit-oriented and arrangement-caused transient responses during the phase difference recognition time are avoided or one waits for them to end, and, thus, precise acquired values of the phase difference are stored, as a result whereof potential errors in the correction of the phase position of the second carrier signal by the identified phase difference are minimized.

In an embodiment, a digital, modulated reference carrier signal is derived from the second carrier signal, whereby the digital, modulated carrier signal having the predetermined phase position is formed during the phase difference recognition time and, following the phase difference recognition time, the digital, modulated reference carrier signal is formed with the phase position corrected by the identified phase difference—. In an embodiment, during the phase difference recognition time, the digital, modulated second carrier signal is formed with the assistance of phase values representing the predetermined phase position and digital phase signals representing the phase difference. At the end of the phase difference recognition time, the phase values represented by the digital phase signals are stored and additional phase values are derived from the stored phase values and stored. After the phase difference recognition time, the digital, modulated second carrier signal is formed with the assistance of the stored values and of the stored, additional phase values—. As a result of this embodiment, i.e. due to the derivation or generation of digital signals, the disadvantages occurring in analog circuits or arrangements—for example, temperature and voltage drift—are avoided and, thus, the quality of the demodulation of the message data transmitted by the first carrier signal is avoided.

In an embodiment, advantageously, the digital, modulated second carrier signal is converted digital-to-analog, and is converted into an analog, first sub-carrier signal having the first frequency. Further, an analog, second sub-carrier signal having a second frequency is derived from the second carrier signal. The modulated, second carrier signal having the predetermined phase position or the phase position corrected by the identified phase difference is formed from the first and second sub-carrier signal, whereby the modulated second carrier signal comprises a frequency exhibiting the sum of the frequencies of the first and second sub-carrier signals—. As a result of this embodiment, digital means for deriving and generating said digital signals can be clocked with a low clock frequency—for example, less than or equal to 155 MHz—and, thus, the inventive method can be realized in an especially economical fashion.

Another embodiment provides for fast synchronization of a first analog carrier signal having a predetermined phase position with a second reference carrier signal with the assistance of a digital unit. The digital unit is advantageously realized with a low number of simple, digital components, being realized in an extremely cost-beneficial way and with little technological outlay, whereby fast ASDICS or PGAs are available for the realization.

These and other features of the invention(s) will become clearer with reference to the following detailed description of the presently preferred embodiments and accompanied drawings.

DESCRIPTION OF THE DRAWINGS

FIG. 1 is a block schematic diagram of an arrangement for fast synchronization of two carrier signals.

DETAILED DESCRIPTION OF THE PRESENTLY PREFERRED EMBODIMENT

In a block circuit diagram, FIG. 1 shows an arrangement by way of example for realizing the inventive method for fast synchronization of two carrier signals. The arrangement is part of a circuit-oriented component that is arranged in a reception module of a base station (not shown) realizing a point-to-multipoint radial system (not shown). A number of network termination units (not shown) are connected by a number of wireless radial channels to a base station arranged in the middle of a radial cell (not shown). The connection between the base station and the network termination units comprises, for example, an aggregate bit rate of 155 MBit/s, whereby the aggregate bit rate is distributed onto the connected network termination units. In this exemplary embodiment, the individual network termination units have access onto the commonly employed, wireless transmission medium (radial channel) in alternation with a time-division access method—also referred to as time division multiple access or TDMA method. Given TDMA transmission methods, the individual network termination units alternately transmit signals having a specific time length—also referred to below as signal bursts—to the base station. The access onto the commonly employed transmission medium "radial channel" is controlled by the base station, i.e. the point in time at which a network termination unit is allowed to send information to the base station is defined.

Figure 2A:
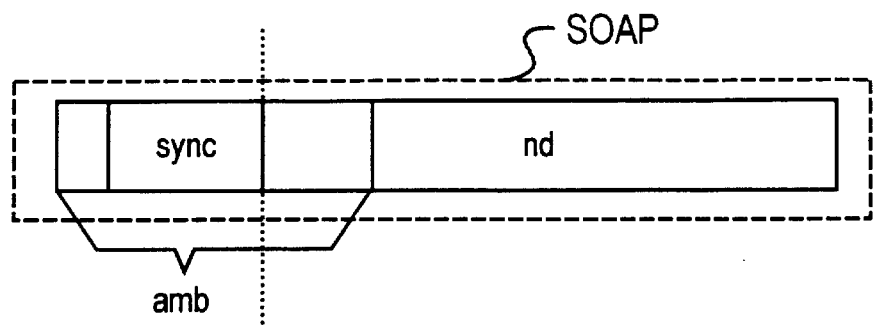
FIG. 2 shows the time curves of signals shown in FIG. 1.
Figure 2B:
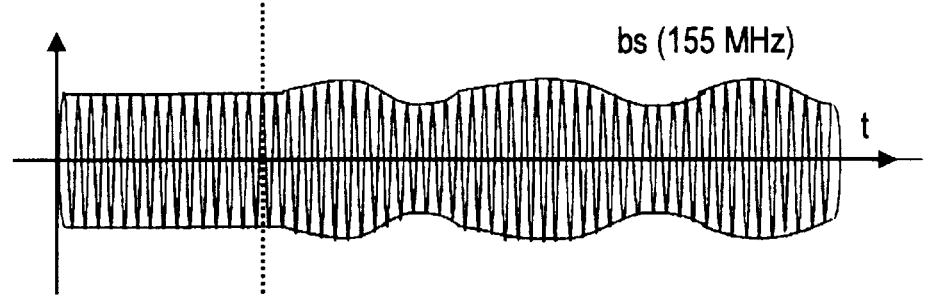

With the assistance of the arrangement shown in FIG. 1, the transmission of SOAP data frames—Siemens Optical Advanced PON—already realized for the transmission medium of "light waveguide" is transferred onto the wireless transmission medium "radial channel", i.e. individual network termination units connected to the base station send digitally existing information having a data scope of 60 bytes to the base station in a signal burst. FIG. 2A, for example, shows a SOAP data frame SOAP specific for the upstream direction. With the assistance of the illustrated SOAP data frame SOAP, 60 bytes of data are transmitted, whereby the first 7 bytes of the SOAP data frame SOAP are provided as a preamble amb. Of the preamble amb covering 7 bytes of data, 40 bits are available as synchronization bits sync for the receiver-side determination of the signal parameters—amplitude as well as carrier and clock phase. The remaining 53 bytes of the SOAP data frame are available for the transmission of message data nd, for example an ATM cell. The SOAP data frame SOAP shown in FIG. 2A is modulated with a coherent modulation method, for example an Offset Quadrature Phase Keying—also referred to as Offset Quadrature Phase Shift Keying OQPSK—, being modulated onto a carrier signal having a specific carrier frequency, 155 MHz in this case. FIG. 2B shows the time curve of the phase-modulated carrier signal or of the signal bursts bs. Since the individual network termination units exhibit different distances from the base station, the individual signal bursts bs sent from the network termination units exhibit both a different amplitude as well as a different carrier and clock phase. The reception unit (not shown) arranged in the base station is in a synchronization time during the reception of the preamble given arrival of a SOAP data frame SOAP—for example, "Runin"—of 258 ns, corresponding to the transmission duration of the 40 synchronization bits sync contained in the preamble amb given a transmission rate of 155 Mbit/s.

According to FIG. 1, a signal or a signal burst bs transmitted by a network termination unit and arriving at a reception unit of the base station (not shown) is supplied to an input ED of a demodulated DEM. The signals bs pending at the input ED is demodulated by the demodulator DEM with the assistance of a carrier signal ts adjacent at an input ET. The demodulator DEM comprises two outputs AI, AQ via which two phase signals is, qs that are generated by the demodulator DEM and represent the respective phase information are conducted. According to FIG. 1, the first phase signal is—which is also referred to as the in-phase signal or I-signal and that is represented by the in-phase component of the phase information—is adjacent at the output AI, and the second phase signals qs—which is referred to as well as quadrature phase signal or Q-signal and that represents the quadrature component of the phase information—is adjacent at the output AQ of the demodulator DEM. The signal burst bs arriving at the base station and adjacent at the input ED of the demodulator DEM is simultaneously conducted to an input EB of a comparatory unit BD. The comparatory unit BD is configured such that this acquires the time beginning and the time end of the arriving signal burst bs—the comparatory unit BD is also referred to as burst detector. Dependent on the measured result, the comparatory unit BD farms a burst recognition signal ds and conducts this to an output AV of the comparatory unit BD. The output AV is connected via a connecting line to an input ES of a memory unit SPS—for example, to the input of an unstable flip flop. The unstable flip flop is realized, for example, by a D-flip flop.

Further, the output AV of the comparatory unit BD is connected via a connecting line to a control input EZ of the counter Z. A signal zs clocked with 155 MHz and realizing the counting frequency of the counter Z is conducted to a further input ZSE of the counter Z. The counter Z can be set to a specific final count value ZWZ—illustrated by a dotted rectangle. When a burst recognition signal ds representing a start signal—for example, leading signal edge—is adjacent at the control input EZ of the counter Z, the counting procedure is started with a counting frequency of 155 MHZ. When a final count value ZWZ is reached, an overflow signal us is generated by the counter Z and is communicated via an output ZA of the counter Z to a reset input RE of the memory unit SPS. Dependent of the signals ds, us adjacent at the inputs ES and RE of the memory unit SPS, a memory unit SPS generates a control signal shs and forwards this to an output AS of the memory unit SPS.

The output AS of the memory unit SPS is respectively connected via control lines to a control output SS of a first and second memory amplifier SH1, SH2. The two memory amplifiers SH1, SH2 each respectively comprise an input ES, whereby the input ES of the first memory amplifier SH1 is connected to the output AI of the demodulator DEM, and the input ES of the second memory amplifier SH2 is connected to the output AQ of the demodulator DEM. Further, the memory amplifiers SH1, SH2 respectively comprise an output AH, whereby the output AH of the first memory amplifier SH1 is connected to a first phase input E1 of a modulator MOD, and the output EH of the second memory amplifier SH2 is connected to a second phase input EQ of the modulator MOD. As a result of the two memory amplifiers SH1, SH2, the amplitude value of a phase signal is, qs adjacent at the input ES is acquired within the time interval usually referred to as acquisition phase—also referred to as sample phase—, and a signal ihs, qhs exhibiting the acquired amplitude value is generated and conducted to the output AH after the expiration of the acquisition phase for a time interval usually referred to as hold phase.

The reference carrier signal RS having a frequency of 155 MHz is conducted to a clock input EM of the modulator MOD via a connecting line. The 155 MHz clock of the reference clock signal rs is derived, for example, from a cell transport system (not shown) arranged in the base station, and exhibits the same frequency as the signal continuously sent in the direction of the network termination units—downstream direction. The carrier frequency of the signal bursts bs sent by the network termination units to the base station is derived from the signal received by the network termination units and continuously transmitted in the downstream direction. As a result of this coupling of the signals or signal bursts transmitted in the downstream and the upstream direction—only the signal bursts bs communicated in the upstream direction is indicated in FIG. 1—, the reference carrier signal rs and the received signal bursts bs exhibit the same frequency but, due to transmission running times in the transmission medium "radial channel"—respectively exhibit a different phase position or a phase difference $\Delta\phi$. The reference carrier signal rs adjacent at the input EM of the modulator MOD is modulated or phase-modulated with the specific phase $\Delta\phi$ by the modulator MOD and by means of the two phase signals is, qs or ihs, qhs representing a phase information or a phase difference $\Delta\phi$ and derived from the outputs AI, AQ of the demodulator DEM, whereby the phase-modulated signal ms1 that is formed is conducted to an output AM of the modulator MOD.

In an embodiment, the output AM of the modulator MOD is connected to the auxiliary carrier input ET of the demodulator DEM whereby the phase-modulated carrier signal ms1 adjacent at the output AM is conducted to the input ET as auxiliary carrier signal ts.

The inventive method for fast synchronization of the signal burst bs adjacent at the input ED of the modulator DEM with the auxiliary carrier signal ts or ms1 adjacent at the input ET of the demodulator DEM with the arrangement shown in FIG. 1 is explained in greater detail below.

Figure 2C:
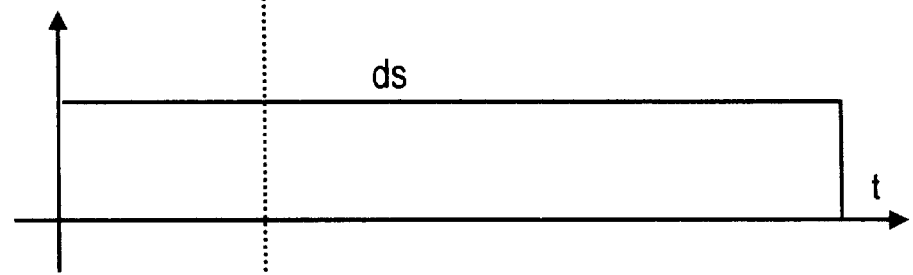

According to FIG. 2B, the signal burst bs adjacent at the input ED of the demodulator DEM exhibits a constant or predetermined phase position $\phi$ of, for example $\phi=135°$, during the time span of the "Runin" covering 258 ns. The constant phase position of $\phi=135°$ during the "Runin" is permanently set at the transmission side, i.e. at the side of the network termination units. The signal bursts bs arriving at the input ED of the demodulator DEM is acquired by the comparator unit BD and this generates the burst recognition signal ds representing the time duration of the signal bursts bs and conducted to the output AV of the comparator unit BD. For example, a leading edge of the burst recognition signal ds represents the signal start, and a trailing edge of the signal ds represents the signal end of the signal burst bs—indicated in FIG. 2C. Due to the presence of a leading edge at the clock input ES of the memory unit SPS, the control signal shs adjacent at the output AS of the memory unit SPS is set into the active condition—for example, active high. At the same time, the counting procedure is started by the presence of the leading edge at the input EZ of the counter Z. In this exemplary embodiment, the final count value ZWZ of the counter Z is set such that, given a counting frequency of 155 MHz realized by the signal zs, the final count value ZWZ is reached after approximately 100 through 200 ns. After reaching the final count value ZWZ, the counter Z generates the overflow signal us representing a counter overflow and communicates this via the output ZA of the counter Z to the reset input RE of the memory unit SPS.

Figure 2D:
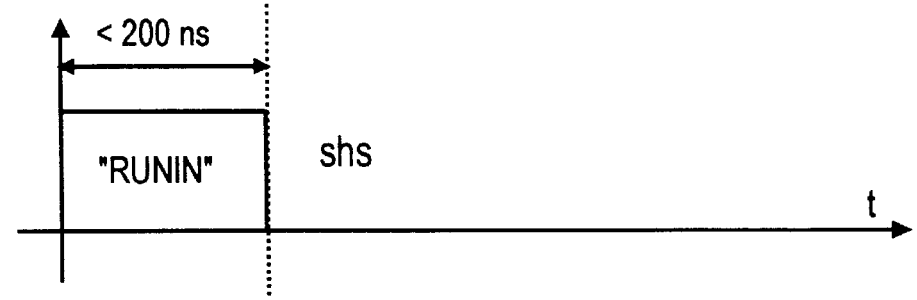

Given the presence of an overflow signal us at the reset input RE signaling an overflow—for example, due to a leading edge—, the memory unit SPS generates a corresponding signal shs, for example representing an inactive condition, and conducts this to the output AS. The time curve of the signal SHS adjacent at the output AS of the memory unit SPS during the "Runin" is shown in FIG. 2D. The signal shs generated by the memory unit SPS is in the active condition—for example, active high—during the time period of the "Runin" and is switched into the inactive condition during the rest of the time curve of the signal burst bs. Due to the presence of the signal shs switched into the active condition at the control input SE of the first and second memory amplifier SH1, SH2, the two memory amplifiers SH1, SH2 are switched into the acquisition condition or into the hold phase. Given memory amplifiers SH1, SH2 switched into the hold phase, the phase signals is, qs representing the phase information or the phase difference of the signal bursts bs and adjacent at the outputs AI and AQ of the demodulator DEM are acquired by the memory amplifiers SH1, SH2 and are stored. During the "Runin", the phase signal ihs adjacent at the output AH of the first memory amplifier SH1 exhibits a fixed amplitude value of +1 due to a pre-setting, and the phase signal qhs adjacent to the output AH of the second memory amplifier SH2 exhibits a fixed amplitude value of −1.

Due to the presence of the phase signal ihs=+1 at the input E1 and of the phase signal qhs=−1 at the input eq of the modulator MOD, this is permanently set to the rated phase of $\Phi=135°$ during the "Runin", as a result whereof the reference clock signal rs adjacent at the input EM of the modulator MOD is phase-modulated with a phase position of $\Phi=135°$ and, as modulated reference clock signal or carrier signal ms1, is conducted via the output AM to the carrier input ET of the demodulator DEM.

During the "Runin", the demodulator DEM compares the phase position of the arriving signal burst bs—sent from a network termination unit with a rated phase of $\Phi=135°$—to the phase position of the carrier signal ms1 or ts pre-set to $\Phi=135°$. Given detection of a deviation or phase difference $\Delta\phi$ of the signal burst bs from the rated phase of $\Phi=135°$ caused by transmission running times in the "radio channel", the demodulator DEM generates the corresponding phase signals is, qs representing the phase difference $\Delta\phi$ and conducts these via the outputs AI and AQ to the corresponding inputs ES of the two memory amplifiers SH1, SH2.

When the final count value ZWZ is reached in the counter Z, an overflow signal us is communicated to the memory unit SPS, and the signal shs adjacent at the output AS of the memory unit SPS is switched into the inactive condition. Due to the presence of a signal shs switched into the inactive condition at the inputs SE of the two memory amplifiers SH1, SH2, these are switched into the hold condition from the acquisition condition. Given memory amplifiers SH1, SH2, switched into the hold condition, the last amplitude value of the adjacent phase signal is, qs adjacent during the acquisition condition at the input ES is stored, and a signal ihs, qhs is generated with the stored amplitude value, this being connected during the time span of the hold condition—i.e. up to the end of the running time of the signal burst bs—to the output AH of the memory amplifier SPS. As a result of the phase signals ihs and qhs adjacent that the outputs AH of the first and second memory amplifiers SH1, SH2, the phase difference Δφ identified during the "Runin" and representing the phase signals ihs, qhs is conducted to the control inputs E1, EQ of the modulator MOD, as a result whereof the reference clock signal rs adjacent at the input EM of the modulator MOD is corrected by the value of the phase difference Δφ represented by the phase signals ihs, qhs or is adapted to the phase position of the signal burst bs currently identified during the "Runin".

With the arrangement shown in FIG. 1, a phase shift or phase difference Δφ of signal bursts bs arriving at a base station and caused by transmission errors in the transmission medium "radio channel" is corrected in a very fast way and, thus, an error-optimized demodulation of high bit rate data streams or of signal bursts bs exhibiting respectively different signal parameters is enabled.

According to an advantageous embodiment of the arrangement shown in FIG. 1—illustrated with dashed lines in FIG. 1—, the reference clock signal rs is conducted to an input EM of a further modulator MOD'—also referred to as setting modulator. Due to the presence of a phase signal ihs' exhibiting the amplitude value +1 at the input E1 and due to the presence of a phase signal qhs' exhibiting the amplitude value -1 at the input EQ of the setting modulator MOD', the reference clock signal rs adjacent at the input EM is phase-modulated with a permanently set or predetermined phase position of Φ=135° and is conducted to the output AM. According to this embodiment, the outputs AM of the two modulators MOD, MOD' are respectively connected to a first and second input M1, M2 of a multiplexer MUX. The multiplexer MUX comprises a control input ME connected to the output AS of the memory unit SPS, as a result whereof the signal shs adjacent at the output AS of the memory unit SPS is conducted to the control input ME. Further, the multiplexer MUX comprises an output AX connected to the carrier input ET of the demodulator DEM. The multiplexer MUX is configured such that, during the phase difference recognition time or during the "Runin"—i.e., for example, given a signal shs at the control input ME representing the active condition—, the carrier signal ms2 adjacent at the output AM of the setting modulator MOD' is connected to the output AX of the multiplexer MUX and, thus, is supplied to the input ET of the demodulator DEM as carrier signal ts. After the expiration of the phase difference recognition time or after the end of the "Runin"—i.e., for example, given a signal shs at the control input ME representing the inactive condition—, the carrier ms1 adjacent at the output AM of the modulator MOD is connected to the output AX of the multiplexer MUX and is supplied to the input ET of the demodulator DEM as carrier signal ts. As a result of this embodiment, a switching of the inputs E1, EQ of the modulator MOD to different voltage values following the "Runin"—, i.e., a change of the voltage values of the adjacent signals ihs, qhs—is no longer required, whereby the switching times of the arrangement shown in FIG. 1 are advantageously minimized further by the arrangement of the setting modulator MOD' and of the multiplexer MUX.

According to a further development, the output AM of the setting modulator MOD' is connected to the input ET of the demodulator DEM, and the output AM of the modulator MOD is connected to an input ET of a further demodulator DEM'—indicated by dotted lines. The first analog carrier signal bs is brought to a further input ED of the further demodulator DEM'. As already explained, the presence of a phase signal ihs' exhibiting the amplitude value +1 at the input E1 and the presence of a phase signal qhs' exhibiting the amplitude value -1 at the input EQ of the setting modulator MOD' phase-modulates the reference carrier signal rs adjacent at the input EM with a permanently set or predetermined phase position of Φ=135° and this is conducted via the output AM to the input ET of the demodulator DEM. After the expiration of the phase difference recognition time or after the end of the "Runin", the modulated reference carrier signal ts (ms1) adjacent at the output AM of the modulator MOD and corrected by the identified phase difference is conducted to the input ET of the further demodulator DEM'. The phase signals is', qs' adjacent at the outputs of the further demodulator DEM' represent the demodulator message signal after the phase difference recognition time. Due to the provision of a further demodulator DEM', the additional switch means or the multiplexer MUX of the embodiment described above can be foregone, as a result whereof additional switching events are avoided and, thus, the switching times of the described arrangement are minimized farther, and the quality of the demodulation of the message data nd communicated by the signal bs is improved further.

Advantageously, the analog arrangement shown in FIG. 1 for synchronization of two carrier signals bs, rs can be realized with digital switch elements, i.e. with the assistance of digital multiplexers, adders and bistable flipflops (not shown). Due to the utilization of digital switch elements, the disadvantageous occurring in analog circuits—for example, temperature and voltage drift—are avoided, and, thus, the quality of the demodulation of the message data nd communicated by the first carrier signal bs is improved. Advantageously, the digital switch elements are represented by a high-quality, i.e. fast, bipolar ASIC. The reference carrier signal required for the synchronization can, for example, be generated by reading out signal values stored in a memory—also referred to as "lookup table". In order to enable a modulation of this digitally generated reference carrier signal rs, the stored signal values must be read out with at least four times the clock rate of the frequency of the generated signal rs—i.e. at least four samples per signal period—, being read out from the "lookup table" with the readout rate of 4*155 MHz=622 MHz in this exemplary embodiment and, thus, the ASIC is clocked with a control clock rate of at least 622 MHz. This, however, can only be realized with an extremely high economic outlay.

Figure 3:
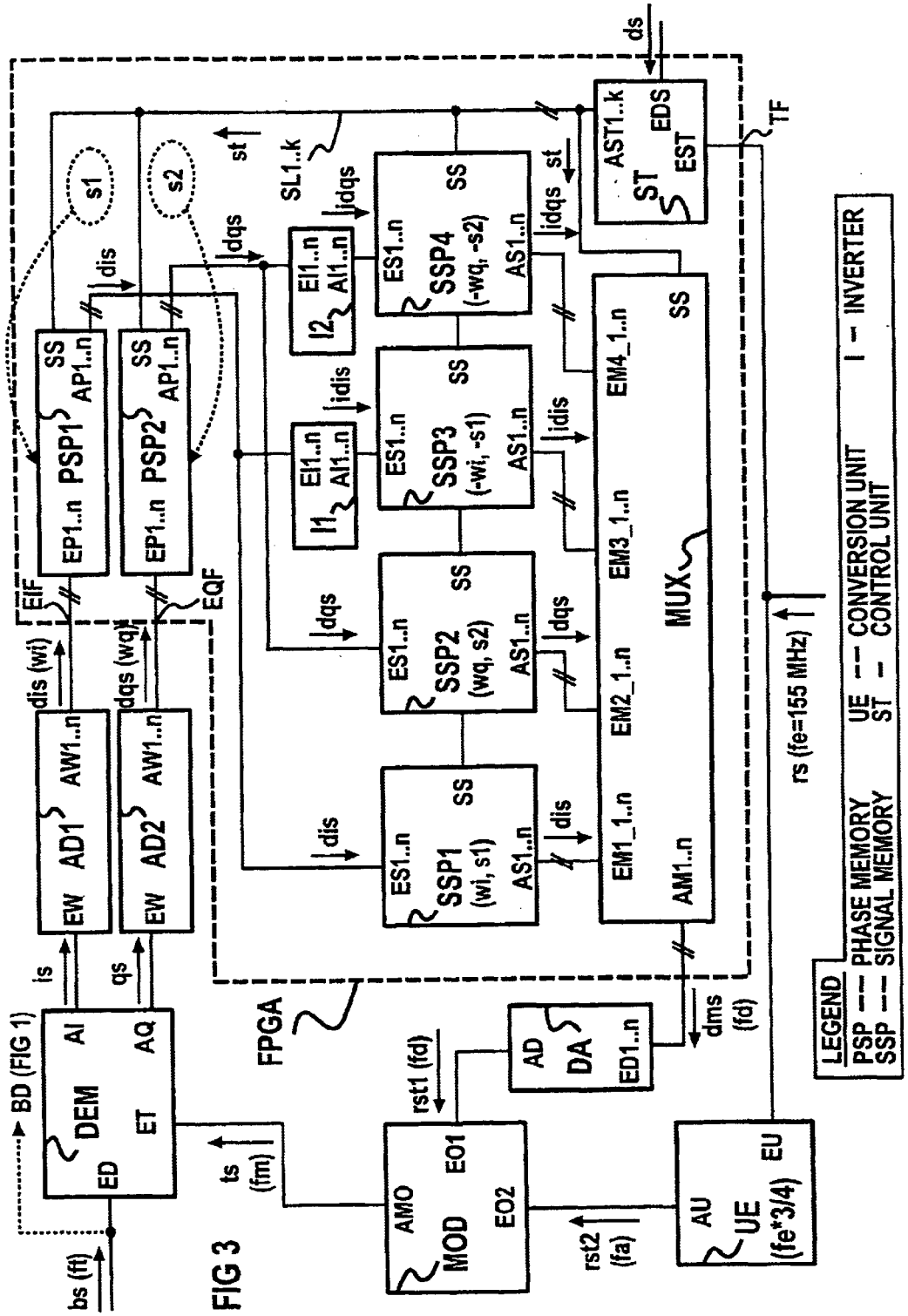
FIG. 3 is a block schematic diagram of an arrangement for cost-beneficial digital realization of the present inventive method for fast digital synchronization of two carrier signals.

FIG. 3 shows an advantageous, economical, i.e. cost-beneficial realization of the inventive method for fast digital synchronization of two carrier signals, whereby a part of the analog switch elements shown in FIG. 1 is realized by digital switch elements with a FPGA—field programmable gate array shown in FIG. 3 with a dashed rectangle. Given this embodiment, the FPGA is clocked with a reference clock signal or reference carrier signal rs having a clock frequency of less than or equal to 155 MHz. According to FIG. 3, a signal or a signal burst bs arriving at a base station (not shown) is conducted to an input of an analog demodulator DEM. The signal bs adjacent at the input ED is demodulated by the demodulator DEM with the assistance of an auxiliary carrier or with the assistance of a modulated reference carrier signal ts adjacent at an input ET. The signal burst bs arriving at the base station and adjacent at the input ED of the demodulator DEM is simultaneously conducted to a comparator unit BD that is shown in FIG. 1 and is appropriately described with reference thereto—indicated in FIG. 3 with a dashed arrow. FIG. 1 at the corresponding description is referenced in view of the acquisition of the time start and of the time end of the arriving signal burst bs. The demodulator DEM comprises two outputs AI, AQ to which two phase signals is, qs generated by the demodulator DEM and representing the respective phase information of the signal bs adjacent at the input ET are conducted.

The phase signals is, qs adjacent at the outputs AI, AQ of the demodulator DEM are respectively conducted to an input EW of an analog-to-digital converter AD1, 2, with which the analog phase signals is, qs are converted into digital phase signals dis, dqs having, for example, a word width of 8 bits. The digital phase signals dis thereby represents a first phase value wi, and the digital phase signal dqs represents a second phase value wq, whereby the two phase values wi, wq cover a value range from "0" through "256" given a word width of 8 bits. The two analog-to-digital converters AD1,2 respectively comprise a number of outputs AW1 . . . n that are connected via parallel data lines to corresponding inputs EP1 . . . n of a first and second phase memory PSP1,2. The two phase memories PSP1,2 are realized, for example, by bistable flipflop registers. A phase value wi, wq respectively communicated with the assistance of the digital phase signals dis, tqs can be stored in each phase memory PSP1,2. Each of the two phase memories, PSP1,2 comprises a number of outputs AP1 . . . n. The outputs AP1 . . . n of the first phase memory PSP1 are connected via data lines to inputs ES1 . . . n of a first signal memory SSP1 and to inputs EI1 . . . n of a first inverter I1, whereby outputs AI1 . . . n arranged at the first inverter are connected via data lines to inputs ES1 . . . n of a third signal memory SSP3. The outputs AP1 . . . n of the second phase memory PSP are connected via data lines to inputs ES1 . . . n of a second signal memory SSP2 and to inputs EI1 . . . n of a second inverter I2, whereby outputs AI1 . . . n arranged at the second inverter I2 are connected via data lines to inputs ES1 . . . n of a fourth signal memory SSP4. The four signal memories SSP1 . . . 4 each respectively comprise a number of outputs AS1 . . . n that are connected via data lines to correspondingly fashion inputs EM1_1 . . . n, EM2_1 . . . n, EM3_1 . . . n, EM4_1 . . . n of a multiplexer MUX. A digital phase value W1,2 or inverted, digital phase value −W1, −W2 represented by a digital phase signal dis, dqs adjacent at the inputs ES1 . . . n or by an inverted digital phase signal idis, idqs can be respectively stored in each of the four signal memories SSP1 . . . 4. As a result of the multiplexer MUX-advantageously fashioned as bus multiplexer—, only one of the digital phase signals or inverted digital phase signals idis, idqs adjacent at the outputs AS1 . . . n of the four signal memories SSP1 . . . 4 or at the inputs EM1_1 . . . n, EM2_1 . . . n, EM3_1 . . . n, EM4_1 . . . n of the multiplexer MUX is through-connected at any given point in time to outputs AM1 . . . n arranged in the multiplexer MUX.

The outputs AM1 . . . n of the multiplexer MUX are connected via data lines to inputs ED1 . . . n of a digital-to-analog converter DA. The digital-to-analog converter comprises an output AD that is connected to a first input EO1 of an analog modulator MOD. The modulator MOD is connected via an output AMO and via a connecting line to the auxiliary carrier input ET of the demodulator DEM. Via a second input EO2, the modulator MOD is connected to an output AU of a conversion unit UE, whereby an input EU arranged in the conversion unit UE is connected to the reference carrier signals rs conducted to the FPGA. In this exemplary embodiment, the conversion unit UE realizes a frequency converter that converts the frequency of the reference carrier signal rs—having an input frequency of fe=155 MHz—adjacent at the input EU into an output frequency fa=fe*¾. The reference carrier signal rs—via a clock input TF of the FPGA—continues to be conducted to a clock input EST of a clock control unit or a control unit ST arranged in the FPGA. The control unit ST is connected via control outputs AST1 . . . k, a number of control lines SL1 . . . k and via control inputs SS to respectively the multiplexer MUX, the four signal memories SSP1 . . . 4 and to the two phase memories PSP1,2. Among other things, the storage events of the phase and signal memories PSP1,2, SSP1 . . . 4 as well as the switching events of the multiplexer MUX are controlled by the clock control signals st generated by the control unit ST.

The inventive method for fast digital synchronization of the signal burst bs adjacent at the input ED of the demodulator DEM with the auxiliary carrier signal adjacent at the input ET of the demodulator DEM or with the modulator reference carrier signal ts with the arrangement shown in FIG. 3 is explained in greater detail below.

As already described with reference to FIG. 1, the signal burst adjacent at the input ED of the demodulator DEM comprises a constant phase position or a permanently phase position on the part of the network termination units of $\phi=135°$ during the time span of the "Runin" covering 258 ns. As already described with reference to FIG. 1, a burst recognition signal ds representing the time duration of the signal burst bs is derived—with a comparator unit BD that is not shown in FIG. 3 but is indicated with a dashed arrow—from the signal burst bs arriving at the input ED of the demodulator DEM and is conducted to a control input EDS of the control unit ST. Further, the counter Z shown and described in FIG. 1 is functionally integrated in the control unit ST.

As already explained, the phase-modulated reference carrier signal ts adjacent at the input ET of the demodulator DEM exhibits a rated phase $\phi=135°$ during the time period of the "Runin". To that end, start values S1,2 as phase values wi, wq prescribed by presetting and representing the rated phase of $\phi=135°$ are stored in the two phase memories PSP1,2 during the "Runin", for example the start value s1=240 is stored in the first phase memory PSP1 and the start value S2=20 is stored in the second phase memory PSP2—indicated in FIG. 3 by dot-dashed, elliptical circles. In this exemplary embodiment, the value "256" represents the maximum positive amplitude, and the value "0" represents the maximum, negative amplitude of a digital signal dms to be generated from discrete values, whereby the value "128" represents the zero line of the digital signal dms. On the basis of a corresponding configuration of the controller ST—i.e., on the basis of a corresponding drive of the phase and signal memories PSP1,2 and SSP1 . . . 4—, the start value s1 stored in the first phase memory PSP1 at the beginning of the "Runin" is stored in the first signal memory SSP1 as phase value wi and is stored in the third signal memory SSP3 as inverted phase value −wi. Correspondingly, the start value s2 stored in the second phase memory PSP2 is stored in the second signal memory SSP2 as phase value wq and is stored in the fourth signal memory SSP4 as inverted phase value −wq. The phase values wi, wq, −wi, −wq or the digital phase signals dis, dqs or inverted phase signals idis, idqs representing these phase values wi, wq, −wi, −wq and adjacent at the inputs EM1_1 . . . n, EM2_1 . . . n, EM3_1 . . . n, EM4_1 . . . n of the multiplexer MUX stored in the four signal memories SSP1 . . . 4 are, in conformity with the control signal st supplied to the multiplexer MUX, sequentially connected onto the outputs AM1 . . . n of the multiplexer MUX with a sampling rate of 155 values per second. The digital signals dms formed from the discrete phase values wi, wq, −wi, −wq and adjacent at the outputs AM1 . . . n of the multiplexer MUX comprises four samples wi, wq, −wi, −wq per oscillation cycle and, thus, exhibits a frequency fd of fd=fe/4= 155/4 MHz.

Figure 4A:
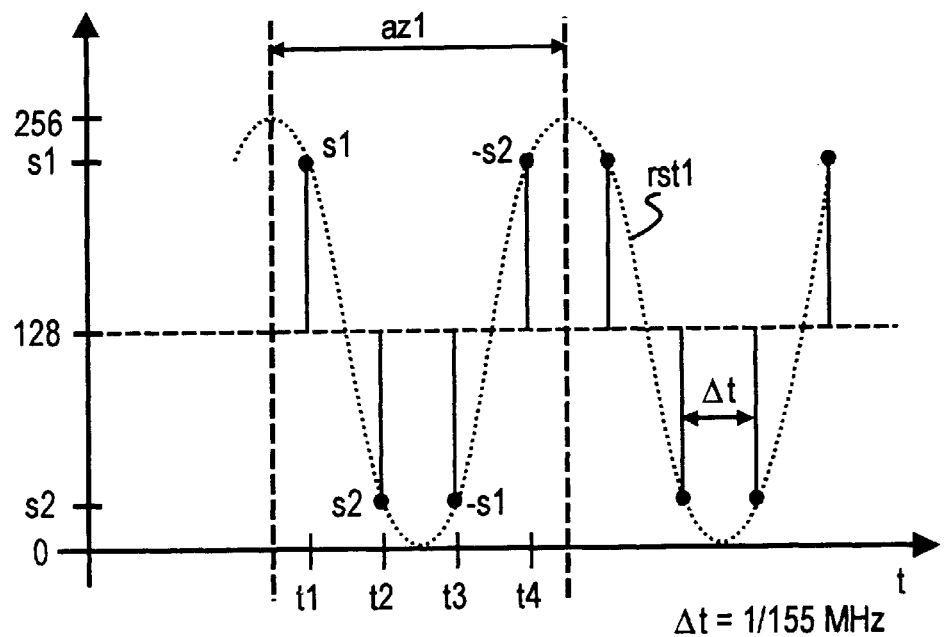
FIG. 4 shows the time curves of a digitally generated signal shown in FIG. 3.

By way of example, FIG. 4A shows the digital signal dms adjacent at the outputs AM1 . . . n of the multiplexer MUX and formed during the "Runin" from the four start values s1, −s1, s2, −s2 stored in the four signal memories SSP1 . . . 4, whereby the start values s1,2 or inverted start values −s1, −s2 adjacent at the outputs AM1 . . . n of the multiplexer MUX during a first readout cycle AZ1 are allocated to the corresponding sampling times t1 . . . 4. The digital signal dms is subsequently digital-to-analog converted by the digital-to-analog converter DA and is supplied as first sub-reference carrier signal rst1 having a frequency fd to the modulator MOD via the input EO1.

As a result of the conversion unit UE, the analog reference carrier signal rs adjacent at the input EU and exhibiting a frequency fe of fe=155 MHz is converted into an analog signal rst2 having an output frequency fa of fa=fe*¾ and is conducted via the output AU to the input EO2 of the modulator MOD as second sub-reference carrier signal rst2. According to known modulator methods, the modulated reference carrier signal ts resulting from the modulation of the first and second reference carrier signal rst1,2 and adjacent at the output AM of the modulator MO2 exhibits an output frequency fm that is formed of the sum of the frequency fa, fd of the sub-reference carrier signals rst1 adjacent at the inputs EO1,2 of the modulator MOD–fm= fa+fd=⅓* fe+¾*fe=fe. Further, the modulated reference carrier signal ts has the same rated phase position of φ=135° as the digital signal dms formed by the multiplexer MUX or as the analog, first sub-reference carrier signal rst1 derived from the digital signal dms.

As already explained in FIG. 1, the demodulator DEM compares the phase position of the arriving signal burst bs—having a rated phase of φ=135° sent by a network termination unit—to the phase position of the modulated reference carrier signal ts preset in the described way to φ=135° during the "Runin" or during the phase difference recognition time. Given identification of a deviation or phase difference Δφ of the signal burst bs from the rated phase of φ=135° caused by transmission running times in the "radio channel", the modulator DEM generates corresponding phase signals is, qs representing the phase difference Δφ and conducts these via the outputs AI and AQ to the inputs EW of the two analog-to-digital converters AD1,2. Toward the end of the "Runin", the digital phase values w1,2 adjacent at the outputs AW1 . . . n of the analog-to-digital converters AD and representing the phase difference Δφ are stored in the two phase memories SPS1,2 by the control unit ST instead of the start values s1,2. Subsequently, the phase values w1,2 adjacent at the outputs AP1 . . . n of the two phase memories PSP1,2 are stored in the first and second signal memory SSP1,2 or the inverted phase values −w1, −w2 represented by the inverted, digital phase signals idis, idqs are stored in the third and fourth signal memory SSP3, 4.

Figure 4B:
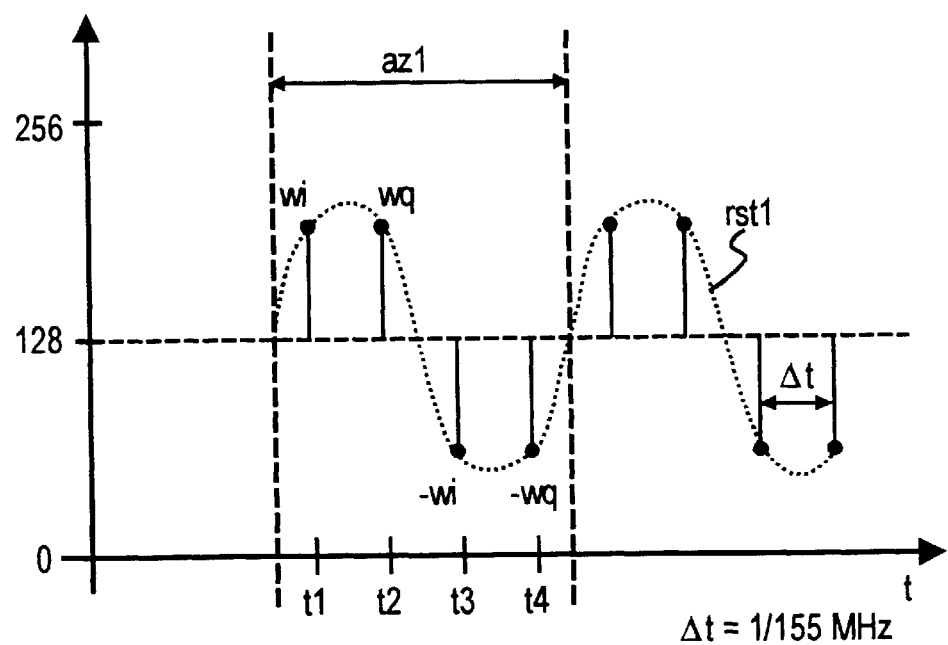

After the end of the "Runin", the digital signals dms having a frequency of fd is formed by the multiplexer MUX from the phase values w1,2 stored in the signal memories SSP1 . . . 4 or from the inverted phase values −w1, −w2, being formed in the described way, whereby the digital signal dms inventively comprises the phase difference Δφ represented by the digital phase signals dis, diq. By way of example, FIG. 4 shows a digital signal dms adjacent after the end of the "Runin" at the outputs AM1 . . . n of the multiplexer MUX and exhibiting the phase difference Δφ, whereby the phase values w1,2 or the inverted phase values −w1, −w2 adjacent at the outputs AM . . . n during the first readout cycle az1 are allocated to the corresponding sampling times t1 . . . 4. After the digital-to-analog conversion has been carried out by the digital-to-analog converter DA, the digital signal dms is supplied via the first input EO1 to the modulator MOD as analog, first sub-reference carrier signal rst1. The modulated reference carrier signals ts formed by the modulation of the supplied, first sub-reference carrier signal rst1 with the supplied, second sub-reference carrier signal rst2 thus exhibits a phase position φ corrected by the value of the identified phase difference Δφ, as a result whereof the modulated reference carrier signal ts is adapted to the current phase position φ of the signal burst bs identified during the "Runin".

The arrangement shown in FIG. 3 can be advantageously realized extremely cost-beneficially and with little technological outlay using a low number of simple, digital components—for example, with the assistance of bistable flipflops or D-flipflops, inverters and multiplexers. For example, fast ASDICS or FPGAs are available for the realization. The increase in the clock rate of ASDICS or FPGAs that is possible with ongoing technological development additionally allows an advantageous, digital realization of the analog circuit components shown in FIG. 3—for example, digital realization of modulator MOD, demodulator DEM and frequency converter UE—upon utilization of complex, digital circuit components—for example, additional adders and multipliers. As a result thereof, the disadvantages of analog circuit components— for example, temperature and voltage drift—are avoided and, thus, the quality of the demodulation of the message data communicated by the signals bs is improved further.

Although modifications and changes may be suggested by those of ordinary skill in the art, it is the intention of the inventors to embody within the patent warranted hereon all changes and modifications as reasonably and properly come within the scope of their contribution to the art.

What is claimed is:

1. A method for fast synchronization of a first analog carrier signal generated at a transmitter with a second carrier signal generated in a receiver, said method comprising:

at least partially modulating a preamble of said first carrier signal with a predetermined phase position at said transmitter;

modulating said second carrier signal with said predetermined phase position at said receiver;

identifying a phase difference between said modulated first carrier signal and said modulated second carrier signal;

during a phase difference recognition time, forming a plurality of phase signals representing said phase difference;

storing values of said phase signals at an end of said phase difference recognition time; and following the phase difference recognition time, correcting a phase position of said second carrier signal by the phase difference represented by the stored phase signals.

2. The method according to claim 1, further comprising:
given a second carrier signal present in analog form, analog modulating said second carrier signal with said predetermined phase position;
identifying an analog phase difference between said modulated first carrier signal and said modulated second carrier signal; and
following said phase difference recognition time, correcting a phase position of said second carrier signal in analog fashion by said phase difference.

3. The method according to claim 1, further comprising:
given a second carrier signal present in digital form, digitally modulating said second carrier signal with said predetermined phase position;
digital-to-analog converting said modulated second carrier signal;
identifying an analog phase difference between said modulated first carrier signal and said modulated, converted second carrier signal; and
following a phase difference recognition time, digitally correcting a phase position of said second carrier signal by said phase difference.

4. The method according to claim 1, further comprising:
given a second carrier signal present in digital form, analog-to-digital converting said analog first carrier signal;
digitally identifying a phase difference between said digitized modulated second carrier signal; and
following a phase difference recognition time, digitally correcting a phase position of said second carrier signal by said phase difference.

5. The method according to claim 1, wherein an analog phase difference is represented by analog phase signals.

6. The method according to claim 5, further comprising the step of:
given a digital correction of said phase position of said digitally existing second carrier signal, analog-to-digital converting said analog phase signals by a converter.

7. The method according to claim 1, wherein a digitally phase difference is represented by digital phase signals.

8. The method according to claim 1, further comprising:
deriving a digital, modulated second carrier signal from said second carrier signal;
during said phase difference recognition time, forming said digital, modulated second carrier signal having said predetermined phase position; and
following said phase difference recognition time, forming said digital, modulated second carrier signal having said phase position corrected by said phase difference.

9. The method according to claim 8,
wherein said digital, modulated second carrier signal is formed during said phase difference recognition time with assistance of a plurality of phase values representing said predetermined phase position; and
said method further comprising:
during said phase difference recognition time, forming a plurality of phase signals representing said phase difference;
storing said phase values represented by said digital phase signals at an end of said phase difference recognition time;
deriving additional phase values from said stored phase values;
storing said derived additional phase values; and
following said phase difference recognition time, forming said digital, modulated second carrier signal with assistance of said stored phase values and of said stored, additional phase values.

10. The method according to claim 8, further comprising:
digital-to-analog converting said digital, modulated second carrier signal;
converting said digital-to-analog converted modulated second carrier signal into an analog, first sub-carrier signal having a first frequency;
deriving an analog, second sub-carrier signal having a second frequency from said second carrier signal; and
forming said modulated second carrier signal, with a phase position taken from the group consisting of said predetermined phase position and said phase position corrected by said phase difference, from said first and second sub-carrier signals, said modulated second carrier signal comprising a frequency exhibiting a sum of the frequencies of said first and second sub-carrier signals.

11. The method according to claim 10, wherein said modulated second carrier signal is formed by modulation of said first sub-carrier signal with said second sub-carrier signal.

12. The method according to claim 9, further comprising the step of:
forming a plurality of additional phase values by inversion of said phase values.

13. A system for fast synchronization of a first analog-carrier signal generated in a transmitter with a second carrier signal generated in a receiver, said system comprising:
a transmitter having a first modulator for an at least partial modulation of a preamble of said first carrier signal with a predetermined phase position;
a receiver having:
a second modulator for modulation of said second carrier signal with said predetermined phase position,
a phase difference identification device for determining a phase difference between said modulated first carrier signal and said modulated second carrier signal, and
a correction device for correction of a phase position of said second carrier signal by an phase difference,
wherein said second modulator is a modulator for modulation of said second carrier signal with said predetermined phase position,
wherein said phase difference identification device is a demodulator, said demodulator comprising:
a first input for receiving said modulated first carrier signal and a second input for receiving said second modulated carrier signal,
a phase difference identifier for identification of a phase difference between said modulated first carrier signal and modulated second carrier signal, and
a phase signal generator for generating a plurality of phase signals representing said identified phase difference, said generated phase signals being conducted to a plurality of inputs of said modulator; and
a memory for storing said generated phase signals at an end of a phase difference recognition time and, subsequently, for connecting said stored phase signals to said inputs of said modulator.

14. The system according to claim 13,
wherein said second modulator is an analog/digital modulator for analog/digital modulation of said second carrier signal with said predetermined phase position; and wherein said phase difference identification device is an analog/digital demodulator, wherein the phase difference identifier performs an analog/digital identification of a phase difference between said modulated first carrier signal and modulated second carrier signal;

wherein the phase signal generator generates a plurality of analog/digital phase signals; and wherein said second modulator further comprises:
  a correction unit for correction of a phase position of said phase difference being represented by a plurality of adjacent phase signals after a phase difference recognition time; and said receiver further comprising:
  a control signal generator allocated to said second modulator and for generating a control signal being derived from said first, analog carrier signal representing a beginning and an end of said phase difference recognition time.

15. The system according to claim 13,
wherein said second modulator is an analog/digital setting modulator for analog/digital modulation of said second carrier signal with said predetermined phase position; and wherein said receiver further comprises:
  an analog/digital demodulator comprising:
    a first input for receiving said modulated first carrier signal and a second input for receiving said modulated second carrier signal;
    a phase difference identification device for an analog/digital identification of a phase difference between said modulated first carrier signal and said modulated second carrier signal; and
    a digital phase signal generator for generating a plurality of analog/digital phase signals representing said phase difference, said generated phase signals being conducted to a plurality of outputs of said demodulator; and
  wherein said correction device is an analog/digital third modulator for correction of said phase position of said second carrier signal by said phase difference represented by said number of adjacent phase signals, following a phase difference recognition time, said third modulator having a plurality of inputs connected to a plurality of outputs of said demodulator; and
  wherein said receiver further comprises:
    a switching unit for time switching of said modulated second carrier signals generated by said setting modulator and said third modulator to said second input of said demodulator; and
    a control signal generator allocated to said switching unit for generating a control signal derived from said first analog carrier signal and representing a beginning and an end of said phase difference recognition time.

16. The system according to claim 13, wherein said receiver further comprises:
an analog/digital setting modulator for analog/digital modulation of said second carrier signal with said predetermined phase position;
an analog/digital demodulator connected to said setting modulator, said demodulator comprising:
  a first input for receiving said modulated first carrier signal, a second input for receiving said modulated second carrier signal, and a plurality of outputs;
  a phase difference identifying unit for analog/digital identification said phase difference between said modulated first carrier signal and said modulated second carrier signal; and
  a digital phase signal generator for generating a plurality of analog/digital phase signals representing said phase difference, said generated phase signals being conducted to said outputs of said demodulator;
an analog/digital third modulator connected via a plurality of inputs to said outputs of said demodulator, said correction device for correction of said phase position of said second carrier signal by said phase difference represented by said generated phase signals, following a phase difference recognition time, being allocated thereto;
a further analog/digital demodulator connected to said third modulator, said further demodulator having a first input for receiving said first analog carrier signal and a second input for receiving said second carrier signal corrected by said phase difference; and
a control signal generator allocated to said third modulator, to said setting modulator, to said demodulator, and to said further demodulator for generating a control signal derived form said first analog carrier signal and representing a beginning and an end of a phase difference recognition time.

17. The system according to claim 14, wherein said second modulator is a digital modulator and further comprises a plurality of digital multipliers and a plurality of adders; wherein said analog phase signals representing said phase difference and adjacent at said inputs of said digital modulator are converted analog-to-digital by an analog-to-digital converter.

18. The system according to claim 14,
wherein the memory for storing said generated phase signals is an analog/digital memory.

19. The system according to claim 18, wherein an analog memory is realized by a sample and hold amplifier; and wherein a digital memory is realized by bistable flipflops.

20. The system according to claim 14, further comprising:
a readout device for forming a digital second carrier signal by reading out with a specific readout frequency values stored in a memory.

21. The system according to claim 14, wherein said system is realized at least partially by a bipolar ASIC.

22. The system according to claim 13
wherein said correction unit for correction said phase position of said second carrier signal is a digital unit having a plurality of inputs and a plurality of outputs;
said receiver further comprising:
  a digital-to-analog converter having a plurality of inputs connected to outputs of said digital unit, and an output for outputting a first sub-carrier signal having a first frequency;
  wherein said second modulator has a first input connected to said output of said digital-to-analog converter, and a second input, and an output, said second modulator for modulating and outputting said second carrier signal with a phase position selected from a group consisting of said predetermined phase position and said phase position corrected by said phase difference, said modulated second carrier signal having a frequency formed from a sum of frequencies of said first and second sub-carriers signals adjacent at said first and second inputs of said second modulator;
  a conversion unit connected via an output to said second input of said second modulator, and having an input for receiving a reference carrier signal having an input frequency, said conversion unit for converting said reference carrier signal into a second sub-carrier signal having an output frequency; and a demodulator representing said phase difference recognition means, and having a first-input connected to said output of said second modulator, and having a plurality of outputs connected to said digital unit, and having a second input for receiving said first analog carrier signal.

23. The system according to claim 22, wherein said number of outputs of said demodulator further comprise an in-phase component output and a quadrature component output;

wherein said receiver further comprises:

a first analog-to-digital converter having an input connected to said in-phase component output of said demodulator, and having an output connected to an in-phase component input of said digital unit, said first analog-to-digital converter for generating a digital phase signal representing an in-phase component of said phase position; and a second analog-to-digital converter having an input connected to said quadrature component output of said demodulator, and having an output connected to a quadrature component input of said digital unit, said second analog-to-digital converter for generating a digital phase signal representing a quadrature component of said phase position.

24. The system according to claim 23, wherein said digital unit further comprises:

a first and a second first digital memories respectively having a plurality of inputs connected to said in-phase component input and to said quadrature component input of said digital unit, and each having a plurality of outputs, said first and second first digital memories for storing phase values representing said prescribable phase position;

a first and a second digital inverters each having a plurality of inputs respectively connected to outputs of said first and second first digital memories, said first and second digital inverters for inverting said phase values stored in said first and second first digital memories;

a plurality of second digital memories each having a plurality of inputs respectively connected to said outputs of said first and second digital inverters and to said outputs of said first and second first digital memories, said second digital memories for storing said phase values and said inverted phase values;

a digital multiplexer having a plurality of inputs respectively connected to said outputs of said second digital memories; and a digital clock control unit connected via clock control lines to said first second first digital memories, to said second digital memories, and to said digital multiplexer, said digital clock control unit for forming clock control signals for transferring said phase values into said first and second first digital memories, for transferring said phase values and said inverted phase values into second digital memories, and for sequential transfer of said phase values stored in said second digital memories and of said stored, inverted phase values to said outputs of said digital multiplexer, said digital clock control unit having an input for receiving said second carrier signal.

25. The system according to claim 24, wherein said first and second first digital memories are for storing phase values, said phase values representing an in-phase component and a quadrature component of said prescribable phase position.

26. The system according to claim 24, wherein said digital multiplexer is a multiplexer having a plurality of inputs and a plurality of outputs, said inputs being respectively connected parallel to said outputs of said second digital memories and for receiving digital phase signals respectively representing said stored phase values and said stored, derived phase values communicated from said outputs of said second memories, said multiplexer for sequentially through-connecting said digital phase signals adjacent at said inputs of said multiplexer to said outputs of said multiplexer with a sampling rate dependent on a clock control signal communicated from said clock control unit via a control line to a control input of said multiplexer, a digital signal thereby being formed with said prescribable phase position represented by said phase values.

27. The system according to claim 22, wherein said digital unit is realized by an ASIC.

28. The system according to claim 22, wherein said digital unit is realized by an FPGA.

29. The system according to claim 14, wherein said system is realized at least partially by an FPGA.

* * * * *